(12) United States Patent
Robin

(10) Patent No.: US 8,712,004 B2
(45) Date of Patent: Apr. 29, 2014

(54) NUCLEAR FUEL ASSEMBLY BOTTOM NOZZLE

(75) Inventor: Jean-Pierre Robin, Lyons (FR)

(73) Assignee: Areva NP, Courbevoie (FR)

( * ) Notice: Subject to any disclaimer, the term of this patent is extended or adjusted under 35 U.S.C. 154(b) by 618 days.

(21) Appl. No.: 12/997,811

(22) PCT Filed: Jun. 10, 2009

(86) PCT No.: PCT/FR2009/051092
§ 371 (c)(1),
(2), (4) Date: Mar. 18, 2011

(87) PCT Pub. No.: WO2010/001033
PCT Pub. Date: Jan. 7, 2010

(65) Prior Publication Data
US 2011/0158373 A1    Jun. 30, 2011

(30) Foreign Application Priority Data

Jun. 11, 2008  (FR) ...................................... 08 53881

(51) Int. Cl.
*G21C 3/06* (2006.01)
(52) U.S. Cl.
USPC ........................................................... 376/453
(58) Field of Classification Search
USPC ........................... 376/204, 453, 313, 448, 409
See application file for complete search history.

(56) References Cited

U.S. PATENT DOCUMENTS

| 4,684,495 | A | | 8/1987 | Wilson et al. | |
|---|---|---|---|---|---|
| 4,861,545 | A | * | 8/1989 | Lippert | 376/448 |
| 5,867,551 | A | | 2/1999 | Toshihiko | |
| 7,463,711 | B1 | * | 12/2008 | Wahlquist | 376/409 |

FOREIGN PATENT DOCUMENTS

| JP | 59061798 | | 4/1984 | |
|---|---|---|---|---|
| JP | 6003470 | | 1/1994 | |
| JP | 6003470 A | * | 1/1994 | 376/453 |
| JP | 8094783 | | 4/1996 | |

* cited by examiner

*Primary Examiner* — Michelle Clement
*Assistant Examiner* — John D Cooper
(74) *Attorney, Agent, or Firm* — Davidson, Davidson & Kappel, LLC

(57) ABSTRACT

A nuclear fuel assembly bottom nozzle, of the type including a perforated plate to allow water to pass through it, the nozzle having lateral faces, and at least one anti-debris element positioned on a lateral face to block out debris likely to infiltrate between the bottom nozzle and another adjacent bottom nozzle, characterized in that, in the free state, the or each anti-debris element permanently projects from the lateral face on which it is positioned, the or each anti-debris element being elastically deformable so as to retract towards the lateral face in the event of a force being exerted on the anti-debris element towards the lateral face.

12 Claims, 7 Drawing Sheets

NUCLEAR FUEL ASSEMBLY BOTTOM NOZZLE

The present invention concerns a nuclear fuel assembly bottom nozzle, of the type comprising a perforated plate to allow water to pass through it, the nozzle having lateral faces, and at least one anti-debris element positioned on a lateral face to block out debris likely to infiltrate between the bottom nozzle and another adjacent bottom nozzle.

BACKGROUND

A nuclear fuel assembly for a pressurized water reactor (PWR) traditionally comprises a bundle of nuclear fuel rods and an armature, the armature comprising a bottom nozzle, an upper nozzle, guide tubes connecting the bottom nozzle to the upper nozzle, and retention grids attached on the guide tubes. The rods extend between the bottom nozzle and the upper nozzle, and through the grids that retain them on the armature.

In operation, the assembly is positioned in a nuclear reactor such that the rods extend vertically, and water flows at a high speed along the rods of the nuclear fuel assemblies, passing through the bottom nozzle and the upper nozzle. The water serves as coolant for the heat exchanges, and moderator for the nuclear reaction.

There is a risk of the debris transported by the water damaging the rods of the fuel assembly and requiring that the reactor be stopped to change a rod or an entire assembly. Yet the assemblies are costly, and stopping the reactor is expensive for the operator. To limit this risk, the bottom nozzle has, inter alia, the function of filtering the debris to prevent it from passing through the bottom nozzle.

Nevertheless, a risk remains that debris may infiltrate between two bottom nozzles of two assemblies positioned side by side in the reactor.

JP 6003470 describes a bottom nozzle of the aforementioned type, comprising an anti-debris element positioned on a lateral face of the nozzle, the anti-debris element being made of a shape memory alloy such that the anti-debris element protrudes from the lateral face from a temperature close to the operating temperature of the reactor (indicated as being 300° C.) to filter the debris, and does not protrude from the lateral face below that operating temperature to facilitate the insertion or removal of the assembly into or out of the core of the reactor, respectively.

SUMMARY OF THE INVENTION

However, this bottom nozzle does not make it possible to filter the debris infiltrating between the assemblies during the start and stop phases of the reactor, during which the temperature of the reactor is much lower than the operating temperature, even when these phases are critical. The start phases are in particular critical due to the fact that the debris can be due to manipulations done during the stop of the reactor, before it is restarted.

An object of the invention is to provide a nuclear fuel assembly bottom nozzle allowing effective blocking of the debris while facilitating the installation of the assembly inside the reactor.

To that end, the invention provides a bottom nozzle of the aforementioned type, characterized in that, in the free state, the or each anti-debris element permanently projects from the lateral face on which it is positioned, the or each anti-debris element being elastically deformable so as to retract towards the lateral face in the event of a force being exerted on the anti-debris element towards the lateral face.

According to other embodiments, the bottom nozzle comprises one or several of the following features, considered alone or according to all technically possible combinations:

it comprises a groove formed in the lateral face such that the anti-debris element retracts into the groove in the event of a force being exerted on the anti-debris element towards the lateral face;

the anti-debris element is elongated and has two lateral portions bearing on the lateral face and a central portion protruding from the lateral face, the lateral portions moving away from each other in the event of a force being exerted on the anti-debris element towards the lateral face;

the lateral portions are bearing on the bottom of the groove with a width larger than the distance between the free edges of the lateral portions of the anti-debris element in the free state, the central portion protruding through an opening of the groove emerging on the lateral face.

the opening has a width smaller than said distance between the free edges of the lateral portions of the anti-debris element in the free state;

the groove is defined by a slot formed in the lateral face and forming the bottom of the groove and at least one retention element extending overhanging from one edge of the slot, the free end of the retention element defining the opening;

it comprises two retention elements extending overhanging one another from opposite edges of the slot and defining the opening between their free edges;

it comprises a series of retention elements spaced apart and distributed along a lateral portion in the direction of the length of the anti-debris element, each retention element keeping the lateral portion bearing on the lateral face and allowing sliding of the lateral portion on the lateral face;

a lateral portion comprises, on its free edge, notches in which the retention elements ensuring the retention of the lateral portion on the lateral face are received;

the anti-debris element comprises at least one flat lug extending a lateral portion in the direction of the length of the anti-debris element and engaged under a retention element provided to keep the lateral portion bearing against the lateral face while allowing sliding of the lateral portion on the lateral face; and the or each anti-debris element comprises orifices for the circulation of water through the anti-debris element.

The invention also provides a nuclear fuel assembly including a bundle of nuclear fuel rods and a maintenance frame of the rods, the frame comprising an upper nozzle and a bottom nozzle between which the rods extend, the bottom nozzle being a bottom nozzle as defined above.

BRIEF DESCRIPTION OF THE DRAWINGS

The invention and its advantages will be better understood upon reading the following description, provided solely as an example and done in reference to the appended drawings, in which.

DETAILED DESCRIPTION

Figure 1:
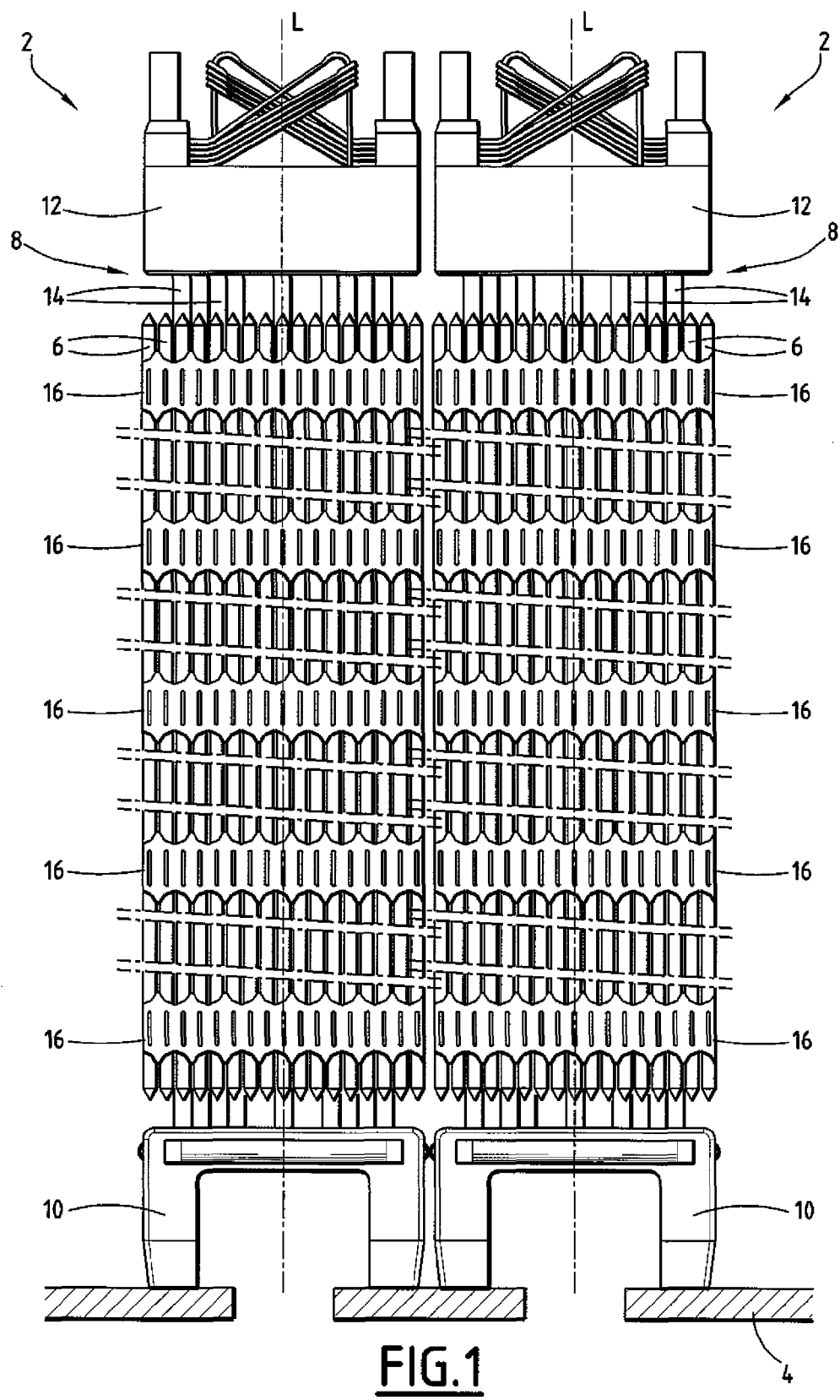
FIG. 1 is a diagrammatic side view of two nuclear fuel assemblies provided with bottom nozzles comprising anti-debris elements according to the invention.

FIG. 1 shows two identical nuclear fuel assemblies 2 placed side by side on the lower plate 4 of the core of a pressurized water nuclear reactor (PWR).

Each assembly 2 is elongated along a longitudinal axis L that extends substantially vertically when the assembly 2 is positioned in the core of the reactor. Hereinafter, the terms "top" and "bottom" are used in reference to the position of the assembly 2 in the reactor.

Each assembly 2 comprises a bundle of nuclear fuel rods 6 and a retention frame 8 for the rods 6.

Each rod 6 traditionally comprises a tubular sheath filled with nuclear fuel pellets.

The frame 8 comprises a bottom nozzle 10, an upper end 12, guide tubes 14 and retention grids 16.

The bottom nozzle 10 and the upper nozzle 12 are spaced along the axis L. The guide tubes 14 extend between the nozzles 10, 12 and connect the nozzles 10, 12 to each other. The gates 16 are attached on the guide tubes 14 and distributed between the nozzles 10, 12.

The rods 6 extend parallel to the axis L through the grids 16 that ensure the longitudinal and transverse retention of the rods 6.

Figure 2:
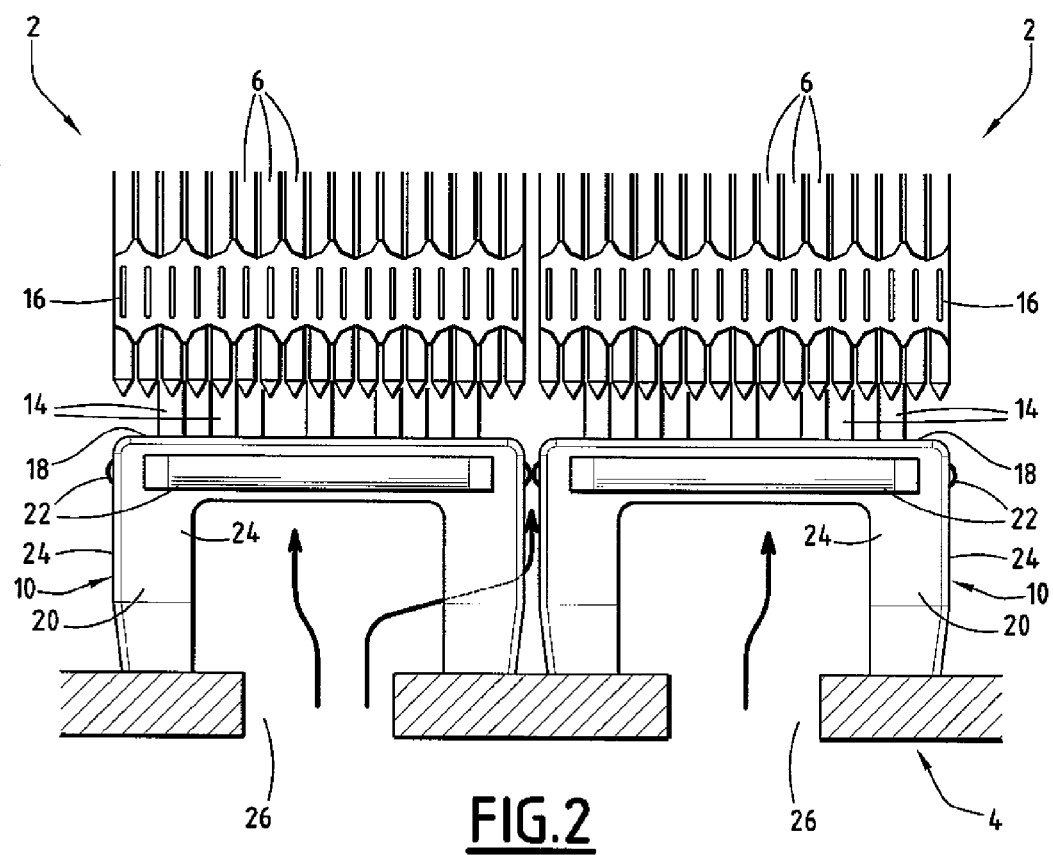
FIG. 2 is an enlarged view of the bottom nozzles of the assemblies of FIG. 1.

As shown in FIG. 2, each bottom nozzle 10 comprises a filtering plate 18, support feet 20, and anti-debris elements 22 attached and positioned on lateral faces 24 of the bottom nozzle 10.

The plate 18 extends transversely to the axis L. It for example has a polygonal profile, here a square profile. Alternatively, it has a hexagonal profile. The feet 20 extend downward from the corners of the plate 18. The bottom nozzle 10 bears on the lower plate 4 via the feet 20.

Each anti-debris element 22 protrudes from the lateral face 24 on which it is mounted.

The lower plate 4 is provided with water inlet orifices 26. At least one orifice 26 emerges under the bottom nozzle 10 of each assembly 2.

Figure 3:
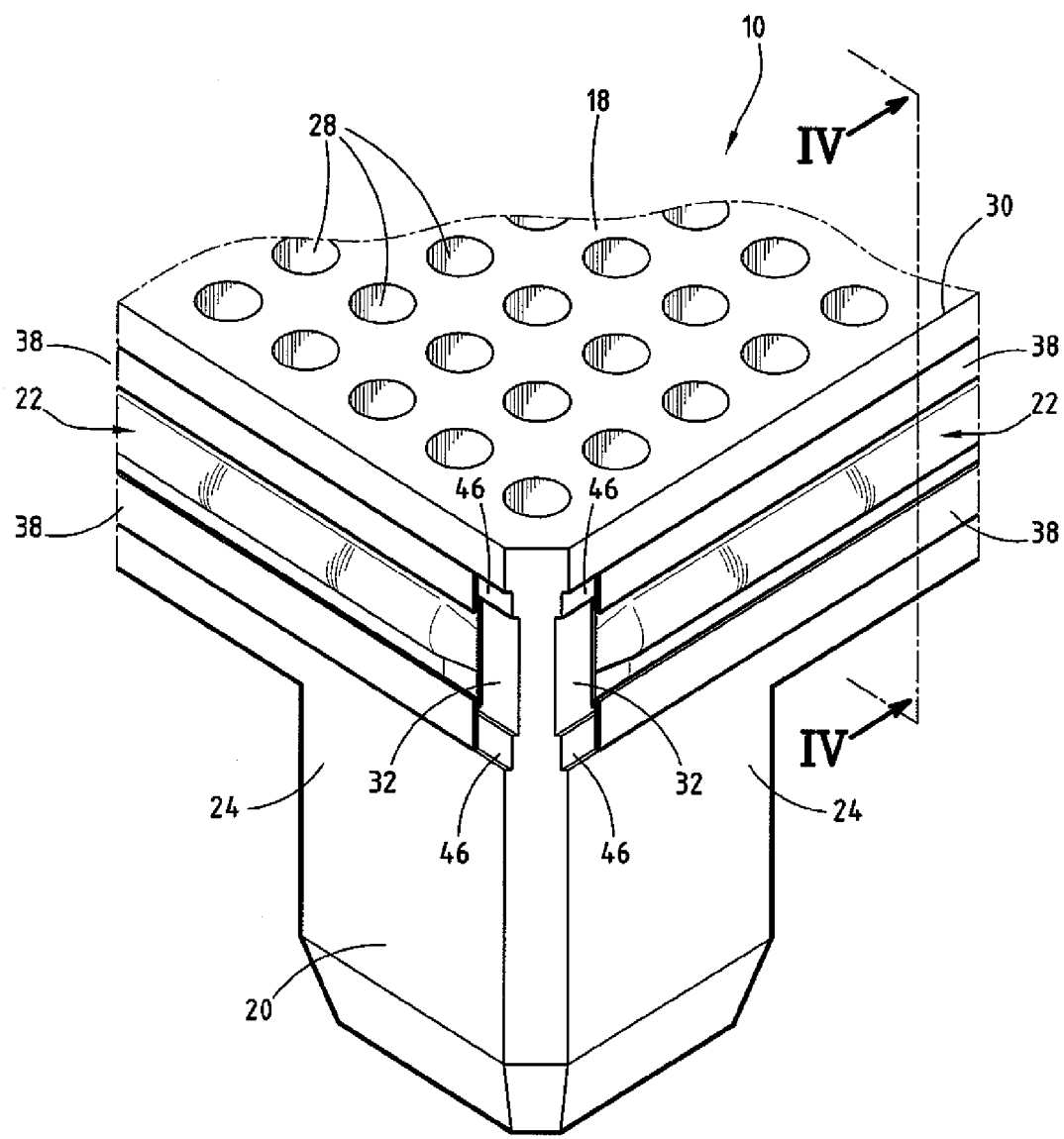
FIG. 3 is a partial perspective view of one of the bottom nozzles of FIG. 2.

As shown in FIG. 3, the plate 18 is perforated to allow water to circulate through it. To that end, the plate 18 for example comprises a plurality of channels 28 going all the way through the plate 18.

Each anti-debris element 22 assumes the form of an elongated elastic blade and extends parallel to the ridge 30 defining the upper edge of the lateral face 24.

Figure 4:
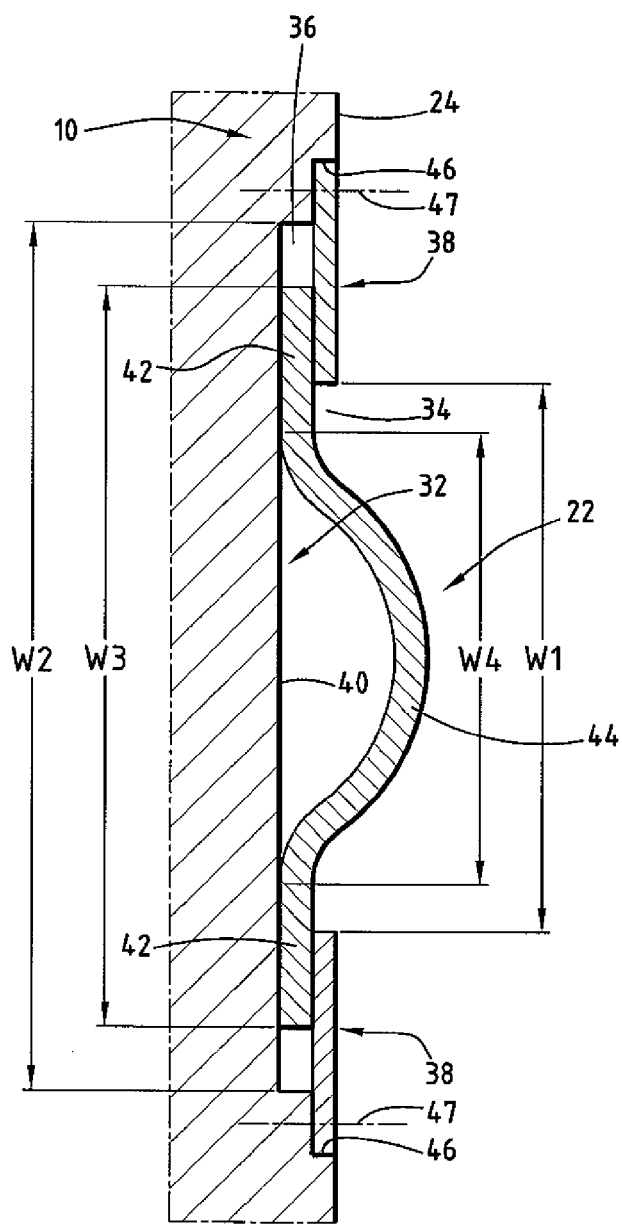
FIGS. 4 and 5 are cross-sectional views of the bottom nozzle along IV-IV in FIG. 3, illustrating an anti-debris element in two different configurations.
Figure 5:
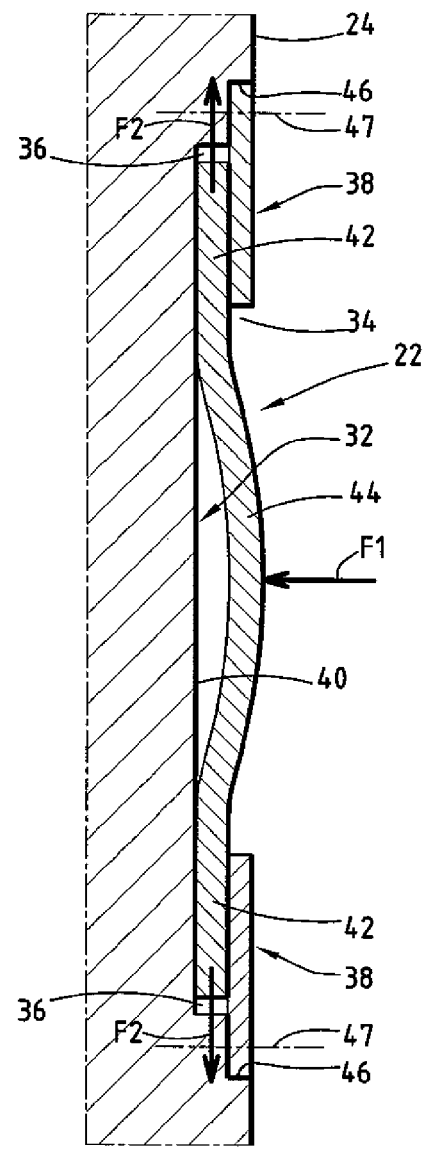

FIGS. 4 and 5 are cross-sectional views along IV-IV of FIG. 3, in which the anti-debris element 22 is shown in the free state and in a compressed state, respectively.

As shown in FIG. 4, the anti-debris element 22 is received in a groove 32 defined in the lateral face 24, and protrudes from the lateral face 24 through an opening 34 of the groove 32 emerging on the lateral face 24.

The groove 32 is defined by an elongated slot 36 formed in the lateral face 24 and retention elements 38 extending from opposite edges of the slot 36 towards each other, and giving the groove 32 a T-shaped section.

The opening 34 is defined between the free edges of the retention elements 38. It has a width W1 smaller than that W2 of the bottom 40 of the groove 32. The bottom 40 is flat and parallel to the lateral face 24.

The anti-debris element 22 has a hat-shaped transverse section, and comprises two flat lateral portions 42 and a curved central portion 44 protruding from the lateral face 24.

The lateral portions 42 are received in the groove 32, in the lateral spaces defining the bars of the T-shaped section defined between the bottom 40 and the retention elements 38.

The width W3 of the anti-debris element 22 considered between the free edges of the lateral portions 42 is smaller than that W2 of the bottom 40 and larger than that W1 of the opening 34. As a result, the anti-debris element 22 is retained transversely to its length in the groove 32.

The central portion 44 has a width W4 smaller than that W1 of the opening 34. The central portion 44 is curved so as to protrude from the lateral face 24 through the opening 34 in the free state of the anti-debris element 22.

The central portion 44 permanently protrudes from the lateral face 24 in the free state of the anti-debris element 22, regardless of the temperature, more particularly in the range of the temperatures encountered in nuclear reactors during the normal and energy production operating phases, the stop phases, and the transitional start and stop phases. This temperature range is generally between ambient temperature, or about 20° C., and about 350° C.

The retention elements 38 are received in clearances 46 formed in the lateral face 24 along the slot 36, such that the retention elements 38 are on the same level as the lateral face 24.

The retention elements 38 are for example fastened using mechanical fastening members 47 such as screws, rivets . . . , diagrammed by broken lines. Alternatively or optionally, the retention elements 38 are fastened on the lateral face 24 by welding.

In the illustrated example, each retention element 38 assumes the form of a continuous elongated bar extending over the majority of the length of the lateral portion 42 it covers. Alternatively, one retention element 38 is replaced by a plurality of retention elements spaced out and distributed along the anti-debris element 22.

As shown in FIG. 5, the anti-debris element 22 is adapted to elastically deform and retract into the groove 32 in the event a force is applied on the central portion 44 and oriented towards the lateral face 24, as illustrated by the arrow F1 in FIG. 5.

In this case, the anti-debris element 22 elastically deforms by crushing the central portion 44 and spacing the lateral portions 42 apart from each other and sliding the latter on the bottom 40, as illustrated by the arrows F2 in FIG. 5.

During operation, in reference to FIG. 2, water is injected through the orifices 26, and circulates in the core of the reactor from the bottom towards the top, through and between the assemblies 2. The water is injected under the bottom nozzles 10. It circulates through the plates 18 and between the rods 6 of each assembly 2. It also circulates between the assemblies 2, passing through passages defined between the adjacent lateral faces 24 of the bottom nozzles 10 of each pair of adjacent assemblies 2.

The water serves as a moderator fluid to moderate the nuclear reaction, and as coolant to remove the heat created in the rods 6 due to the nuclear reaction.

The plate 18 of each bottom nozzle 10 allows the water to pass that circulates in the reactor and blocks any debris that may be present in the water.

The anti-debris elements 22 arranged on the lateral faces 24 block the debris that may be present in the flow of water passing between the assemblies 2. More precisely, the anti-debris elements 22 of the two lateral faces 24 opposite the bottom nozzles 10 reduce the width of the passage defined between these two lateral faces 24, so as to block any debris.

The anti-debris elements 22 permanently protruding in the free state from the lateral faces 24 make it possible to block the debris transported by the flow of water flowing between the assemblies in all of the operating phases of the reactor, and in particular during the transitional start and stop phases.

To remove an assembly 2 from the reactor or introduce it into the reactor, a hook is used that grasps the assembly 2 by its upper nozzle 12. The risk related to this type of operation is of the bottom nozzle 10 touching a rod 6 or a grid 16 of another adjacent assembly 2 in the core of the reactor, and causing damage to the manipulated assembly or one of the adjacent assemblies by possibly creating debris. The anti-debris elements 22 able to retract when they are pushed on limit this risk during handling, and also make it possible to ensure better guiding of the assembly during its insertion or removal from the core of the reactor. Due to their elasticity, they then resume their initial configuration blocking debris.

The anti-debris elements 22 are preferably made of materials with a high limit of elasticity, such as, for example, nickel- or iron-based superalloys, titanium alloys or certain stainless steels with structural hardening, for example those defined by standards AMS (Aerospace Material Specification) 5629 and AMS 5643.

In the illustrated example, the retention elements 38 are attached and fastened on the lateral faces of the bottom nozzle 10. In one alternative not shown, the retention elements are integral with the lateral face 24, a groove 32 for example being machined in the lateral face 24 using a T-shaped burr.

Figure 6:
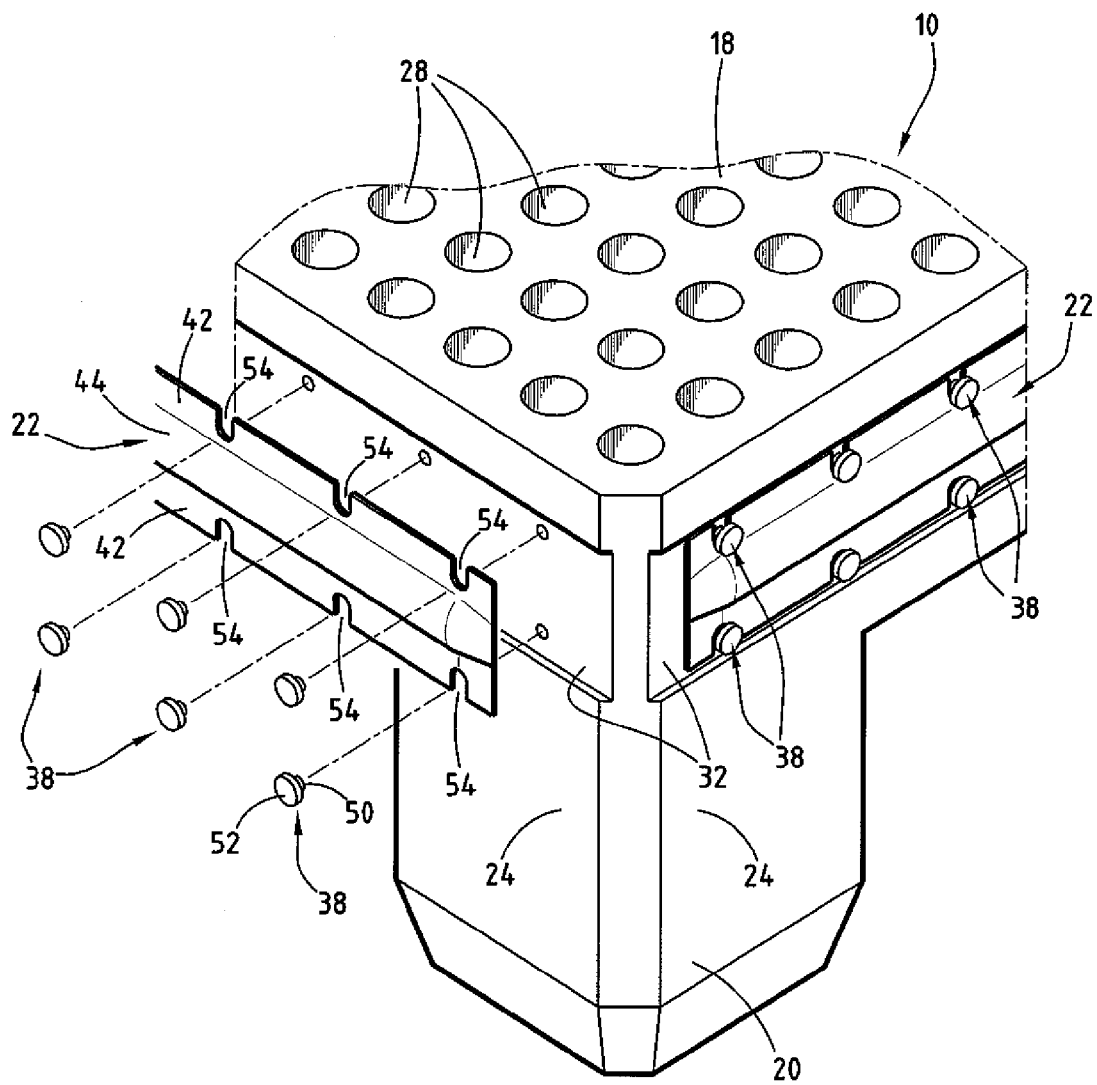
FIGS. 6 and 7 are views similar to that of FIG. 3 and illustrating other bottom nozzle embodiments.
Figure 7:
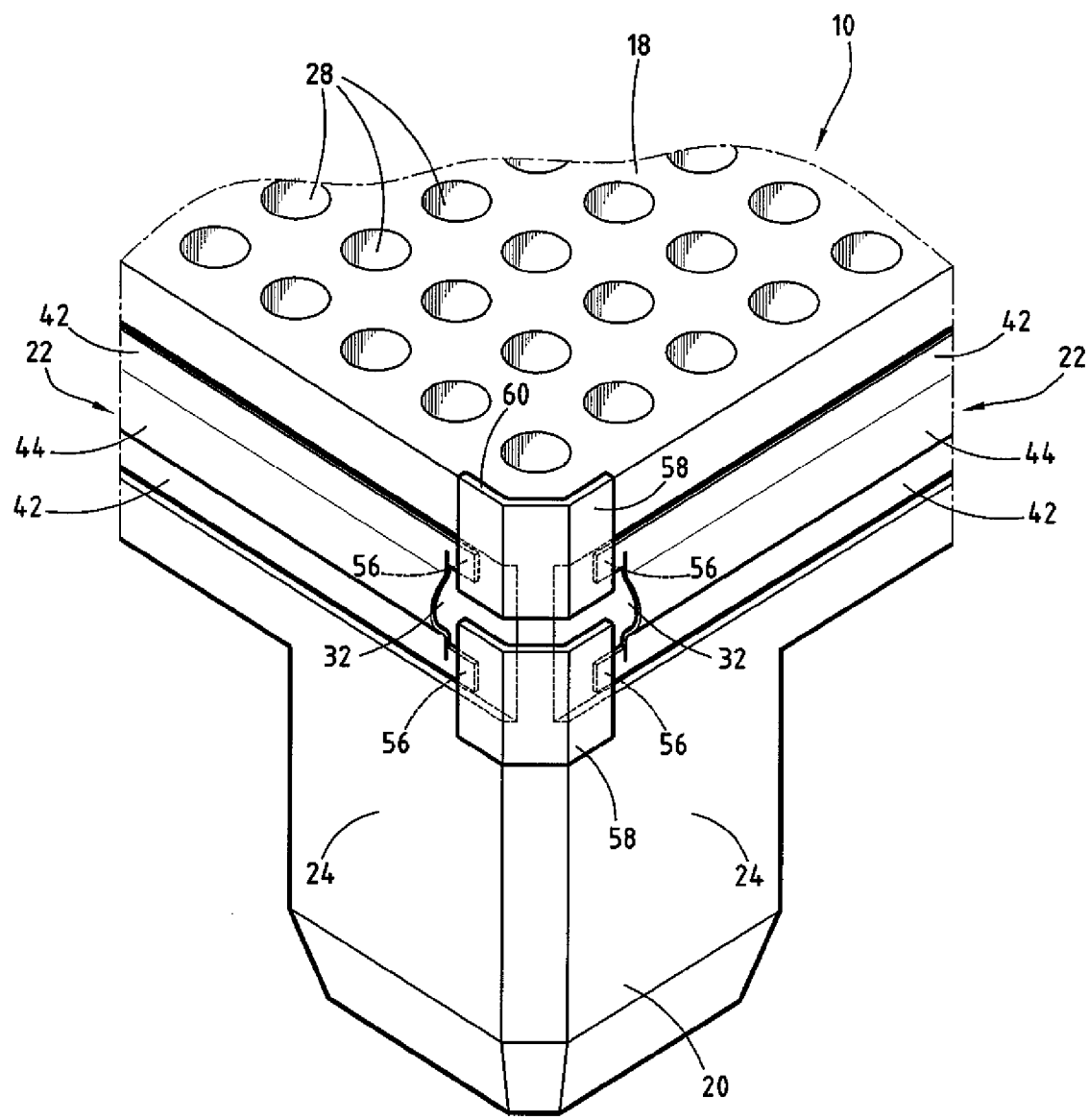

The embodiments of FIGS. 6 and 7 differ from the preceding embodiment in the shape of the retention elements.

In the embodiment of FIG. 6, the bottom nozzle 10 comprises several retention elements 38 spaced apart and distributed along each lateral portion 42 of each anti-debris element 22.

Each retention element 38 comprises a base 50 for fastening the retention element 38 on the bottom 40 of the groove 32, and a disc-shaped head 52 larger than the base 50.

Each lateral portion 42 comprises a plurality of notches 54 for receiving a base 50 of a retention element 38 that are distributed along the free edge of the lateral portion 42. Each notch 54 emerges on the free edge of the lateral portion 42. Each notch 54 is large enough to receive the base 50 of a retention element 38, but too narrow to allow the passage of the head 52 of said retention element 38.

Each notch 54 extends towards the inside of the anti-debris element 22 so as to make it possible to space the lateral portions 42 away from each other during crushing of the central portion 44 towards the bottom 40 of the groove 32.

In the embodiment of FIG. 7, each anti-debris element 22 is retained only at its ends.

To do this, each lateral portion 42 of an anti-debris element 22 is provided with a flat extension 56 extending the lateral portion 42 in the direction of the length of the anti-debris element 22, and retention elements 38 are provided in the form of corner plates 58 fastened in clearances 60 provided on the lateral faces 24 of the bottom nozzle 10, so as to cover the extensions 56.

Each corner plate 58 covers one corner of the bottom nozzle 10 and is used to fasten two anti-debris elements 22 arranged on two adjacent lateral faces 24 of the bottom nozzle 10.

In one alternative, two corner plates 58 positioned on a same corner are replaced by a single corner plate. Alternatively or optionally, one corner plate 58 is replaced by two plates each serving to fasten an anti-debris element 22.

Figure 8:
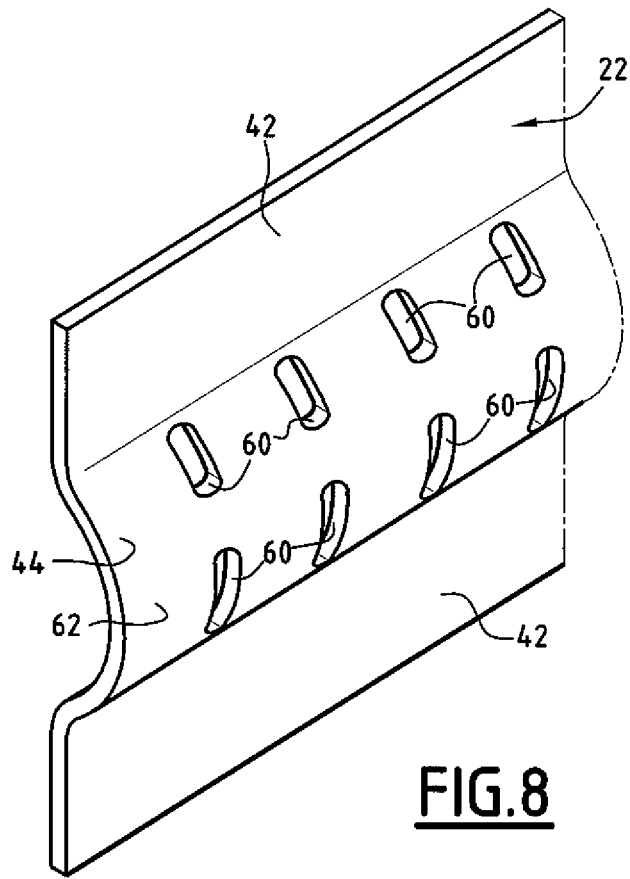
FIGS. 8 and 9 are partial perspective and transverse cross-sectional views, respectively, of an anti-debris element according to one alternative.
Figure 9:
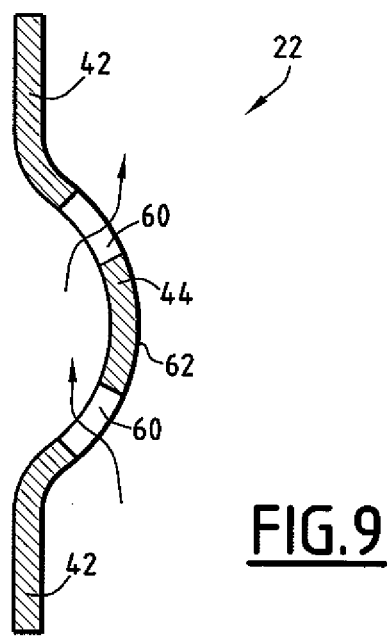

In the alternative illustrated in FIGS. 8 and 9, the anti-debris element 22 differs from that of the alternative of FIGS. 3 to 5 in that it comprises orifices 60 for circulating water through the anti-debris element 22, in order to offer less resistance to the flow of the water and allow cooling of the fuel rods 6 situated on the periphery of the fuel assemblies 2. The orifices 60 are formed in the central portion 44 distributed along the latter part.

In the illustrated example, the anti-debris element 22 comprises a series of lower orifices 60 formed in the lateral portion of the central part 44 adjacent to the lower lateral part 42, and a series of upper orifices 60 formed in the lateral portion of the central part 44 adjacent to the upper lateral part 42.

The lower orifices 60 are situated between the apex 62 of the central portion 44 and the lower lateral portion 42. The upper orifices 60 are situated between the apex 62 and the upper lateral portion 42.

As illustrated in FIG. 9, during operation, water circulates through the anti-debris element 22 while entering under the anti-debris element 22 via the lower orifices 60, and exiting via the upper orifices 60.

To ensure good circulation of the water, each lower orifice 60 is positioned opposite an upper orifice 60 along the anti-debris element 22.

As illustrated in FIG. 8, the orifices 60 have an elongated oblong shape transversely to the anti-debris element 22. Alternatively or optionally, the orifices are oblong and elongated in the direction of the length of the anti-debris element 22 or diagonally in relation to the flow. The orifices 60 can have other geometric shapes and/or be positioned in staggered rows or positioned in a single series. The anti-debris element 22 can also have different combinations of orifices 60 with different shapes and positions.

The invention is not limited to the illustrated embodiments. It is for example possible to combine the embodiments of FIGS. 3, 6 and 7 to provide different types of retention elements or anti-debris elements 22 made in several parts. It is also possible to have anti-debris elements 22 only on two lateral faces 24 of the bottom nozzle 10, for example, the two lateral faces opposite the bottom nozzles 10 of the two adjacent assemblies and the other two lateral faces of the bottom nozzle 10 being free of anti-debris elements 22.

The invention applies to nuclear fuel assembly bottom nozzles for pressurized water reactors (PWR). The invention generally applies to bottom nozzles of any type of nuclear fuel assembly.

The invention claimed is:

1. A nuclear fuel assembly bottom nozzle comprising:
   a perforated plate to allow water to pass through the perforated plate;
   lateral faces; and
   at least one anti-debris element positioned on one of the lateral faces to block out debris likely to infiltrate between the bottom nozzle and another adjacent bottom nozzle,
   wherein in a free state, the at least one anti-debris element permanently projects from the lateral face on which the anti-debris element is positioned, the at least one anti-debris element being elastically deformable so as to retract towards the lateral face when a force is exerted on the at least one anti-debris element towards the lateral face.

2. The bottom nozzle according to claim 1 wherein the lateral face comprises a groove formed such that the at least one anti-debris element retracts into the groove when a force is exerted on the at least one anti-debris element towards the lateral face.

3. The bottom nozzle according to claim 2 wherein the at least one anti-debris element is elongated and has two lateral portions bearing on the lateral face and a central portion protruding from the lateral face, the two lateral portions moving away from each other when the force is exerted on the at least one anti-debris element towards the lateral face.

4. The bottom nozzle according to claim 3 wherein the two lateral portions are bearing on a bottom of the groove, the groove having a width larger than a distance between-free edges of the two lateral portions of the at least one anti-debris element in the free state, the central portion protruding through an opening of the groove emerging on the lateral face.

5. The bottom nozzle according to claim 4 wherein the opening has a width smaller than the distance between the free edges of the two lateral portions of the at least one anti-debris element in the free state.

6. The bottom nozzle according to claim 5 wherein the groove is defined by a slot formed in the lateral face and forming a bottom of the groove and at least one retention element extending overhanging from one edge of the slot, a free end of the retention element defining the opening.

7. The bottom nozzle according to claim 6 wherein two retention elements extending overhanging one another from opposite edges of the slot and defining the opening between the free edges.

8. The bottom nozzle according to claim 7 wherein a series of retention elements are spaced apart and distributed along the lateral portion in a direction of the length of the at least one anti-debris elements, each retention element keeping the lateral portion bearing on the lateral face and allowing sliding of the lateral portion on the lateral face.

9. The bottom nozzle according to claim 8 wherein the lateral portion comprises, on the free edge, notches receiving the retention elements ensuring the retention of the lateral portion on the lateral face.

10. The bottom nozzle according to claim 3 wherein the at least one anti-debris element comprises at least one flat lug extending a lateral portion in a direction of the length of the at least one anti-debris element and engaged under a retention element provided to keep the lateral portion bearing against the lateral face while allowing sliding of the lateral portion on the lateral face.

11. The bottom nozzle according to claim 1 wherein the at least one anti-debris element includes orifices for circulating water through the at least one anti-debris element.

12. A nuclear fuel assembly comprising a bundle of nuclear fuel rods and a maintenance frame of the fuel rods, the frame comprising an upper nozzle and a bottom nozzle between which the fuel rods extend, the bottom nozzle being the bottom nozzle according to claim 1.

* * * * *